US008751957B1

(12) United States Patent
Trajkovic et al.

(10) Patent No.: US 8,751,957 B1
(45) Date of Patent: Jun. 10, 2014

(54) METHOD AND APPARATUS FOR OBTAINING AUDITORY AND GESTURAL FEEDBACK IN A RECOMMENDATION SYSTEM

(75) Inventors: Miroslav Trajkovic, Ossining, NY (US); Srinivas Gutta, Buchanan, NY (US); Mi-Suen Lee, Ossining, NY (US)

(73) Assignee: Pace Micro Technology PLC (GB)

( * ) Notice: Subject to any disclaimer, the term of this patent is extended or adjusted under 35 U.S.C. 154(b) by 974 days.

(21) Appl. No.: 09/718,261

(22) Filed: Nov. 22, 2000

(51) Int. Cl.
*G06F 3/048* (2013.01)
*G06F 3/0481* (2013.01)
*G06F 17/30* (2006.01)

(52) U.S. Cl.
CPC ........ *G06F 3/0481* (2013.01); *G06F 17/30867* (2013.01); *G06F 17/30855* (2013.01)
USPC ........... 715/789; 715/727; 715/728; 715/716; 725/46

(58) Field of Classification Search
CPC ............ G06F 2/0481; G06F 17/30867; G06F 17/30855
USPC ................. 715/727–729, 718, 719, 701, 702; 725/46; 348/460
See application file for complete search history.

(56) References Cited

U.S. PATENT DOCUMENTS

| | | | | |
|---|---|---|---|---|
| 5,089,745 A * | 2/1992 | Iannini | ............................ | 315/76 |
| 5,594,469 A | 1/1997 | Freeman et al. | ............... | 345/158 |
| 5,721,583 A * | 2/1998 | Harada et al. | .................... | 725/24 |
| 5,734,720 A | 3/1998 | Salganicoff | ..................... | 380/20 |
| 5,798,785 A | 8/1998 | Hendricks et al. | ................. | 348/1 |
| 5,844,415 A | 12/1998 | Gershenfeld et al. | ......... | 324/663 |
| 5,973,683 A * | 10/1999 | Cragun et al. | ................. | 345/719 |
| 6,021,403 A * | 2/2000 | Horvitz et al. | .................... | 706/45 |
| 6,081,750 A | 6/2000 | Hoffberg et al. | ................. | 700/17 |
| 6,151,571 A * | 11/2000 | Pertrushin | ..................... | 704/209 |
| 6,156,733 A * | 12/2000 | Ferrara et al. | ................... | 514/21 |
| 6,177,931 B1 * | 1/2001 | Alexander et al. | .............. | 725/52 |
| 6,260,035 B1 * | 7/2001 | Horvitz et al. | .................. | 706/60 |
| 6,326,946 B1 * | 12/2001 | Moran et al. | ................... | 345/156 |
| 6,356,961 B1 * | 3/2002 | Oprescu-Surcobe | ........... | 710/20 |

(Continued)

FOREIGN PATENT DOCUMENTS

| | | | | |
|---|---|---|---|---|
| EP | 0823683 A1 | 2/1998 | ............. | G06F 3/033 |
| EP | 0919906 A2 | 6/1999 | ............... | G06F 3/00 |
| WO | WO9803907 | 1/1998 | ............... | G06F 9/00 |
| WO | WO 9935830 A1 * | 7/1999 | | |

OTHER PUBLICATIONS

Ushida et al. "recognition of Facial expression using conceptual Fuzzy sets", 1993, IEEE, p. 594-599.*

(Continued)

*Primary Examiner* — Linh K Pham
(74) *Attorney, Agent, or Firm* — McKee, Vorhees & Sease, P.L.C.

(57) ABSTRACT

A method and apparatus are disclosed for updating a user profile in a recommendation system for a given user based on auditory or gestural feedback information provided by the user. The auditory or gestural feedback is detected using audio or video processing techniques, or both, and includes, for example, auditory or gestural commands or facial expressions indicating the strength of the user's preferences. The auditory or gestural feedback can be explicit or implicit. Once predefined behavioral feedback is identified, the present invention updates the corresponding user profile, in an appropriate manner.

16 Claims, 5 Drawing Sheets

(56) References Cited

U.S. PATENT DOCUMENTS

| | | | |
|---|---|---|---|
| 6,366,288 B1* | 4/2002 | Naruki et al. | 345/503 |
| 6,400,806 B1* | 6/2002 | Uppaluru | 379/88.02 |
| 6,424,334 B1* | 7/2002 | Zimmerman et al. | 345/158 |
| 6,424,357 B1* | 7/2002 | Frulla et al. | 345/728 |
| 6,466,197 B1* | 10/2002 | Kim et al. | 345/156 |
| 6,484,316 B1* | 11/2002 | Lindberg | 725/17 |
| 6,529,864 B1* | 3/2003 | Chase | 704/9 |
| 6,539,395 B1* | 3/2003 | Gjerdingen et al. | 707/102 |
| 6,571,216 B1* | 5/2003 | Garg et al. | 705/14.25 |
| 6,594,654 B1* | 7/2003 | Salam et al. | 707/3 |
| 6,624,833 B1* | 9/2003 | Kumar et al. | 715/863 |
| 6,629,242 B2* | 9/2003 | Kamiya et al. | 713/100 |
| 6,662,177 B1* | 12/2003 | Martino et al. | 707/3 |
| 6,670,971 B1* | 12/2003 | Oral | 345/769 |
| 6,724,920 B1* | 4/2004 | Berenz et al. | 382/118 |
| 6,728,680 B1* | 4/2004 | Aaron et al. | 704/271 |
| 2003/0066067 A1* | 4/2003 | Gutta et al. | 725/9 |
| 2003/0088872 A1* | 5/2003 | Maissel et al. | 725/46 |
| 2008/0256579 A1* | 10/2008 | Verhaegh et al. | 725/46 |
| 2011/0047487 A1* | 2/2011 | Deweese et al. | 715/758 |
| 2011/0179129 A1* | 7/2011 | McKissick et al. | 709/206 |
| 2011/0320482 A1* | 12/2011 | Barbieri et al. | 707/769 |
| 2012/0148217 A1* | 6/2012 | Ellis et al. | 386/297 |

OTHER PUBLICATIONS

Cox et al.; speech and Languagr Processing for Next-Millennium Communications Services; © 2000; IEEE; 24 pages.*

Ushida et al; Recognition of Facial Expressions Using Conceptual Fuzzy Sets; © 1993; IEEE; 6 pages.*

Antonio Colmenarez et al., "A Probabilistic Framework for Embedded Face and Facial Expression Recognition," Proc. of the Int'l Conf. on Computer Vision and Pattern Recognition, vol. I, 592-97, Fort Collins, Colorado (1999).

* cited by examiner

FIG. 1

PROGRAM DATABASE - 200

| | DATE/TIME 240 | CHANNEL 245 | TITLE 250 | GENRE 255 | ... | ACTOR 270 |
|---|---|---|---|---|---|---|
| 205 → | 11/18/99 -- 8:00 P.M. | CH1 | LUCY | COMEDY | | CLINT DENIRO |
| 210 → | 11/18/99 -- 8:30 P.M. | CH1 | AL'S FAMILY | SITCOM | | JENNIFER COX |
| | ... | | | | | |
| 220 → | 11/18/99 -- 9:00 P.M. | CH3 | YOUR HOUSE | DRAMA | | LUCY VANCE |

FIG. 2

EXPLICIT VIEWER PROFILE 300

| | FEATURE 340 | NUMERICAL (OR SYMBOLIC) REPRESENTATION 350 |
|---|---|---|
| 305 | CHANNEL 2 | 3 |
| 306 | CHANNEL 4 | 4 |
| 307 | CHANNEL 7 | 3 |
| 308 | ... | |
| 309 | SPORTS CHANNEL | 7 |
| .... | MUSIC CHANNEL | 2 |
| | ... | |
| 310 | MORNING PROGRAMS | 1 |
| 311 | EARLY AFTERNOON PROGRAMS | 3 |
| 312 | LATE AFTERNOON PROGRAMS | 7 |
| 313 | EVENING PROGRAMS | 5 |
| | ... | |

FIG. 3A

VIEWING HISTORY 360

| | TIME 370 | TV RATING 371 | SEX RATING 372 | VIOLENCE RATING 373 | LANG. RATING 374 | STATION 375 | TITLE 376 | GENRE 1 377 | ... | GENRE N 378 | CLASS 379 |
|---|---|---|---|---|---|---|---|---|---|---|---|
| 361 | 1930 | TVPG | N | N | N | WPAX | SNFLD | COMEDY | | SITUATION | POS |
| 362 | 2000 | TVG | N | N | N | WPAX | 6TH HEAV. | DRAMA | | FAMILY | POS |
| 363 | 1900 | TVPG | N | N | N | WPAX | FRIENDLY | COMEDY | | SITUATION | POS |
| 364 | 2200 | ? | N | N | N | MAX | STEALTH | ACTION | | ? | POS |
| 365 | 2200 | TVPG | N | N | N | FIM | EDITION | ADVENTURE | | ACTION | POS |
| | ... | | | | | | | | | | |
| 366 | 0530 | ? | N | N | N | ASPN | RACEHORSE | NON-EVENT | | ? | NEG |
| 367 | 1400 | ? | N | N | N | TCL | FORENSIC | ? | | ? | NEG |
| 368 | 0930 | ? | N | N | N | TVL | HITCHCOCK | SUSPENSE | | CLASSIC | NEG |
| 369 | 0730 | TVPG | N | N | N | WPAX | PLANET WAR | CHILDREN | | ANIMATED | NEG |

FIG. 3B

VIEWER PROFILE 300'

| RULE IDENTIFIER 390 | | CONDITIONS 391 | RECOMMENDATION 392 |
|---|---|---|---|
| 381 | RULE 1 | TIME> 1830 & TIME <= 1930 & TV_RATING = TVPG & STATION = WPIX | SAD [98.5%] |
| 382 | RULE 2 | TIME = 2200 & TV_RATING= TVPG & (GENRE1 I GENRE2) = ACTION | HAPPY [96.5%] |
| 383 | RULE 3 | GENRE1 = DRAMA | NEUTRAL |
| .... | | | |
| 384 | RULE N | DEFAULT | NEG [100.0%] |

METHOD AND APPARATUS FOR OBTAINING AUDITORY AND GESTURAL FEEDBACK IN A RECOMMENDATION SYSTEM

FIELD OF THE INVENTION

The present invention relates to recommendation systems, such as recommenders for television programming or other content, and more particularly, to a method and apparatus for updating one or more profiles in such as recommendation system based on auditory or gestural feedback obtained from the user.

BACKGROUND OF THE INVENTION

The number of media options available to individuals is increasing at an exponential pace. As the number of channels available to television viewers has increased, for example, along with the diversity of the programming content available on such channels, it has become increasingly challenging for television viewers to identify television programs of interest. Historically, television viewers identified television programs of interest by analyzing printed television program guides. Typically, such printed television program guides contained grids listing the available television programs by time and date, channel and title. As the number of television programs has increased, it has become increasingly difficult to effectively identify desirable television programs using such printed guides.

More recently, television program guides have become available in an electronic format, often referred to as electronic program guides (EPGs). Like printed television program guides, EPGs contain grids listing the available television programs by time and date, channel and title. Some EPGs, however, allow television viewers to sort or search the available television programs in accordance with personalized preferences. In addition, EPGs allow for on-screen presentation of the available television programs.

While EPGs allow viewers to identify desirable programs more efficiently than conventional printed guides, they suffer from a number of limitations, which if overcome, could further enhance the ability of viewers to identify desirable programs. For example, many viewers have a particular preference towards, or bias against, certain categories of programming, such as action-based programs or sports programming. Thus, the viewer preferences can be applied to the EPG to obtain a set of recommended programs that may be of interest to a particular viewer.

Thus, a number of tools have been proposed or suggested for recommending television programming. The Tivo™ system, for example, commercially available from Tivo, Inc., of Sunnyvale, Calif., allows viewers to rate shows using a "Thumbs Up and Thumbs Down" feature and thereby indicate programs that the viewer likes and dislikes, respectively. In this manner, the Tivo™ system implicitly derives the viewer's preferences from previous television programs that the viewer liked or did not like. Thereafter, the TiVo receiver matches the recorded viewer preferences with received program data, such as an EPG, to make recommendations tailored to each viewer.

Implicit television program recommenders generate television program recommendations based on information derived from the viewing history of the viewer, in a non-obtrusive manner. Explicit television program recommenders, on the other hand, explicitly question viewers about their preferences for program features, such as title, genre, actors, channel and date/time, to derive viewer profiles and generate recommendations.

While such television program recommenders identify programs that are likely of interest to a given viewer, they suffer from a number of limitations, which if overcome, could further improve the quality of the generated program recommendations. For example, the Tivo™ system obtains an explicit indication from the viewer of whether a given watched program was liked or disliked, which is then used to derive the viewing preferences of the user. The Tivo™ system depends on the affirmative action of the user to indicate whether a given watched program was liked or disliked, using the "Thumbs Up" or "Thumbs Down" indicator.

If the user fails to affirmatively indicate whether a given watched program was liked or disliked, the Tivo™ system will assume that the user did not like the watched program. Thus, the Tivo™ system may make false assumptions regarding the viewing preference information associated with the viewing session. In addition, the Tivo™ system typically requires the user to enter the "Thumbs Up" or "Thumbs Down" indicator using the remote control or set-top terminal, which may not be readily accessible or convenient.

A need therefore exists for a method and apparatus for obtaining feedback from a user that can determine or infer whether a given user liked or disliked certain content based on the behavior of the user. A further need exists for a method and apparatus for evaluating the reaction of a viewer to presented content in real-time and for deriving whether or not the viewer liked or disliked the presented content. Yet another need exists for a method and apparatus for a recommendation system that permits the user to indicate the strength of the user's preferences. Finally, a need exists for a method and apparatus for evaluating the reaction of a viewer to presented content that derives the viewing preferences of the user from audio or video information, or both, rather than requiring a manual entry using a specific device.

SUMMARY OF THE INVENTION

Generally, a method and apparatus are disclosed for updating a user profile in a recommendation system for a given user based on auditory or gestural feedback information provided by the user. One or more audio/visual capture devices are focused on the user to detect the auditory or gestural feedback. The detected auditory or gestural feedback may include, for example, predefined (i) auditory commands, (ii) gestural commands, (iii) facial expressions, or (iv) a combination of the foregoing, collectively referred to as "predefined behavioral feedback."

Generally, the predefined behavioral feedback provides a score indicating the strength of the user's preferences, such as preferences for a given program or program feature. In addition, the feedback can be explicit, such as predefined auditory or gestural commands indicating the user's preferences (likes or dislikes), or implicit, such as information that may be derived from facial expressions or other behavior suggestive of the user's preferences. Once predefined behavioral feedback is identified, the present invention updates the corresponding user profile, in an appropriate manner.

A more complete understanding of the present invention, as well as further features and advantages of the present invention, will be obtained by reference to the following detailed description and drawings.

DETAILED DESCRIPTION

Figure 1:
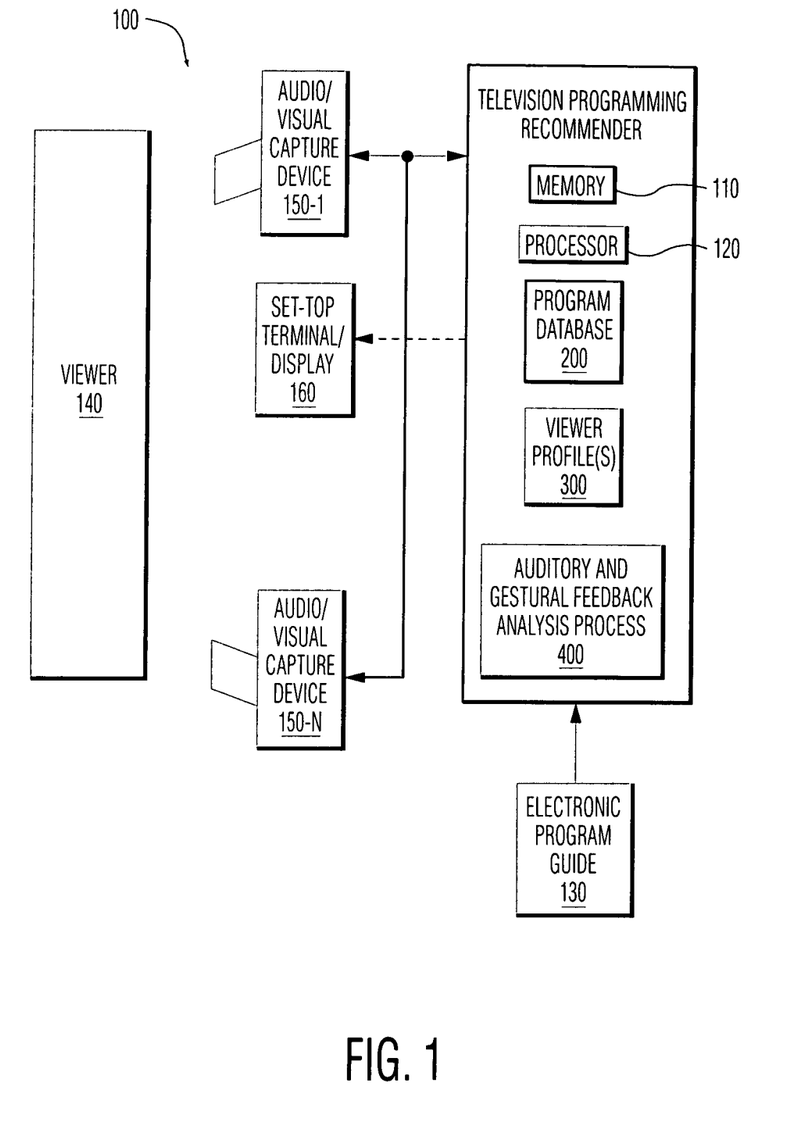
FIG. 1 illustrates a television programming recommender in accordance with the present invention.

FIG. 1 illustrates a television programming recommender 100 in accordance with the present invention. As shown in FIG. 1, the television programming recommender 100 evaluates each of the programs in an electronic programming guide (EPG) 130 to identify programs of interest to one or more viewer(s) 140. The set of recommended programs can be presented to the viewer 140 using a set-top terminal/television 160, for example, using well known on-screen presentation techniques. While the present invention is illustrated herein in the context of television programming recommendations, the present invention can be applied to any automatically generated recommendations that are based on an evaluation of user behavior, such as a viewing history or a purchase history.

According to one feature of the present invention, the television programming recommender 100 determines whether the viewer likes or dislikes a given program based on auditory or gestural feedback from the viewer 140. The auditory or gestural feedback from the viewer 140 can be (i) explicit, such as predefined auditory or gestural commands indicating whether the viewer liked or disliked the program (and, optionally, the extent to which the viewer liked or disliked the program); or (ii) implicit, such as information that may be derived from facial expressions that typically indicate whether the viewer liked or disliked the program. The given program can be a program currently being watched by the viewer 140 or a program or program feature specified by the television programming recommender 100, for example, in a query or survey.

In this manner, since the user is not constrained from using the remote control or set-top terminal as an input mechanism, the present invention provides a flexible mechanism for allowing a user to indicate whether or not the viewer liked or disliked the program. In addition, the television programming recommender 100 can validate whether or not a viewer liked or disliked a given watched program through evaluation of behavioral conduct of the viewer, and not merely assume that a viewer liked a program because it was watched.

As shown in FIG. 1, the television programming recommender 100 includes one or more audio/visual capture devices 150-1 through 150-N (hereinafter, collectively referred to as audio/visual capture devices 150) that are focused on the viewer 140. The audio/visual capture devices 150 may include, for example, a pan-tilt-zoom (PTZ) camera for capturing video information or an array of microphones for capturing audio information, or both.

The audio or video images (or both) generated by the audio/visual capture devices 150 are processed by the television programming recommender 100, in a manner discussed below in conjunction with FIG. 4, to identify one or more predefined (i) auditory commands, (ii) gestural commands, (iii) facial expressions, or (iv) a combination of the foregoing, from the viewer 140 (hereinafter, collectively referred to as "predefined behavioral feedback").

Once predefined behavioral feedback is identified, the television programming recommender 100 updates one or more viewer profiles 300, discussed below in conjunction with FIGS. 3A and 3C, in an appropriate manner. The viewer-supplied auditory or gestural feedback that is detected can correspond to, for example, a score indicating the strength of the viewer's like or dislike of the program or program feature. In addition, the detected auditory or gestural feedback is used by the television programming recommender 100 to update the corresponding viewer profile(s) 300.

As shown in FIG. 1, the television programming recommender 100 contains a program database 200, one or more viewer profiles 300, and an auditory and gestural feedback analysis process 400, each discussed further below in conjunction with FIGS. 2 through 4, respectively. Generally, the program database 200 records information for each program that is available in a given time interval. One illustrative viewer profile 300, shown in FIG. 3A, is an explicit viewer profile that is typically generated from a viewer survey that provides a rating for each program feature, for example, on a numerical scale that is mapped to various levels of interest between "hates" and "loves," indicating whether or not a given viewer watched each program feature. Another exemplary viewer profile 300', shown in FIG. 3C, is generated by a decision tree recommender, based on an exemplary viewing history 360, shown in FIG. 3B. The present invention permits the survey response information, if any, recorded in the viewer profile 300 to be supplemented with the detected auditory or gestural feedback information.

The auditory and gestural feedback analysis process 400 analyzes the audio or video images (or both) generated by the audio/visual capture devices 150 to identify predefined auditory or gestural feedback. Once predefined auditory or gestural feedback is identified, the auditory and gestural feedback analysis process 400 updates the viewer profile 300 in an appropriate manner.

The television program recommender 100 may be embodied as any computing device, such as a personal computer or workstation, that contains a processor 120, such as a central processing unit (CPU), and memory 110, such as RAM and/or ROM. In addition, the television programming recommender 100 may be embodied as any available television program recommender, such as the Tivo™ system, commercially available from Tivo, Inc., of Sunnyvale, Calif., or the television program recommenders described in U.S. patent application Ser. No. 09/466,406, filed Dec. 17, 1999, entitled "Method and Apparatus for Recommending Television Programming Using Decision Trees,", U.S. patent application Ser. No. 09/498,271, filed Feb. 4, 2000, entitled "Bayesian TV Show Recommender," and U.S. patent application Ser. No. 09/627,139, filed Jul. 27, 2000, entitled "Three-Way Media Recommendation Method and System,", or any combination thereof, as modified herein to carry out the features and functions of the present invention.

Figure 2:
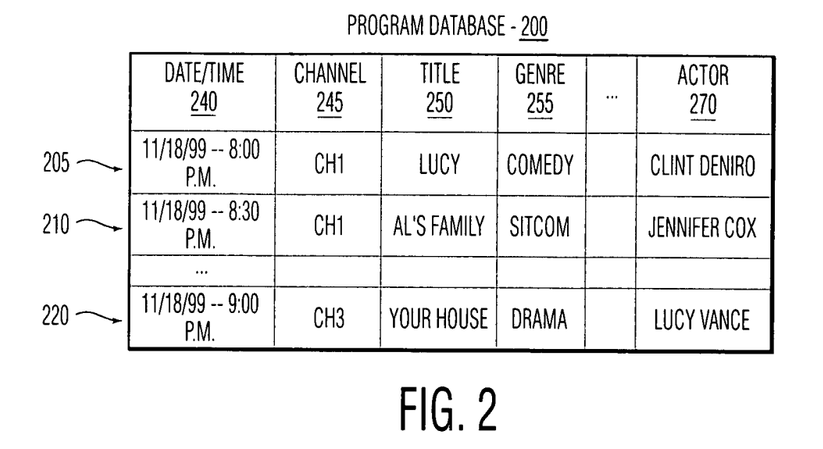
FIG. 2 illustrates a sample table from the program database of FIG. 1.

FIG. 2 is a sample table from the program database 200 of FIG. 1 that records information for each program that is available in a given time interval. As shown in FIG. 2, the program database 200 contains a plurality of records, such as records 205 through 220, each associated with a given program. For each program, the program database 200 indicates the date/time and channel associated with the program in fields 240 and 245, respectively. In addition, the title, genre and actors for each program are identified in fields 250, 255 and 270, respectively. Additional well-known features (not shown), such as duration, and description of the program, can also be included in the program database 200.

Figure 3A:
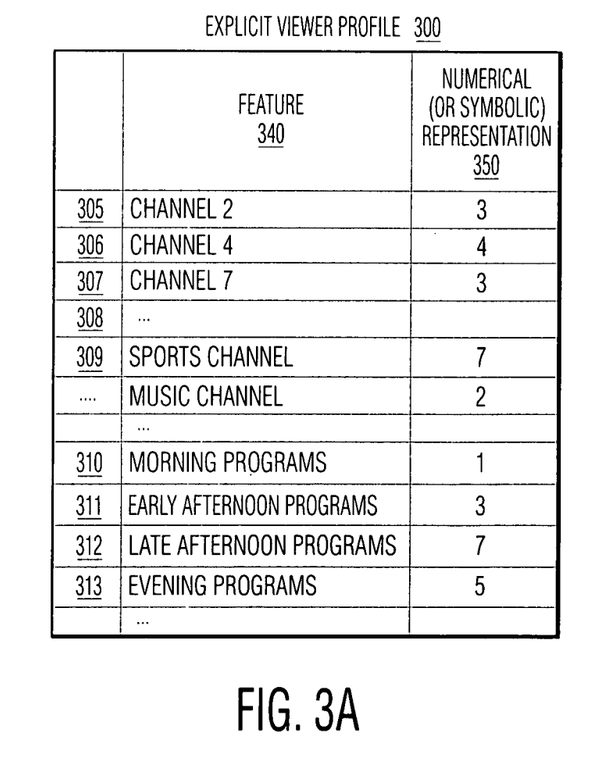
FIG. 3A illustrates a sample table from a Bayesian implementation of the viewer profile of FIG. 1.

FIG. 3A is a table illustrating an exemplary explicit viewer profile 300 that may be utilized by a Bayesian television recommender. As shown in FIG. 3A, the explicit viewer profile 300 contains a plurality of records 305-313 each associated with a different program feature. In addition, for each feature set forth in column 340, the viewer profile 300 provides a numerical representation in column 350, indicating the relative level of interest of the viewer in the corresponding feature. As discussed below, in the illustrative explicit viewer profile 300 set forth in FIG. 3A, a numerical scale between 1 ("hate") and 7 ("love") is utilized. For example, the explicit viewer profile 300 set forth in FIG. 3A has numerical representations indicating that the user particularly enjoys programming on the Sports channel, as well as late afternoon programming.

In an exemplary embodiment, the numerical representation in the explicit viewer profile 300 includes an intensity scale such as:

| Number | Description |
|---|---|
| 1 | Hates |
| 2 | Dislikes |
| 3 | Moderately negative |
| 4 | Neutral |
| 5 | Moderately positive |
| 6 | Likes |
| 7 | Loves |

Figure 3B:
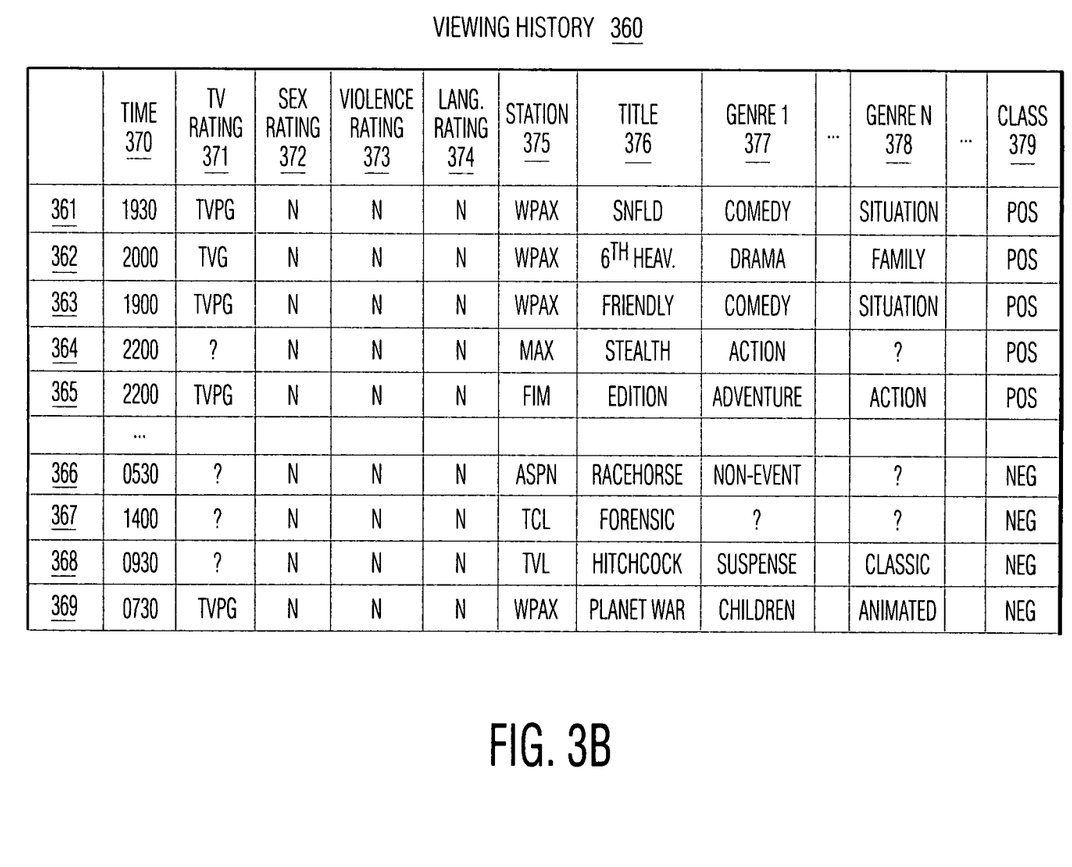
FIG. 3B illustrates a sample table from a viewing history used by a decision tree (DT) recommender.

FIG. 3B is a table illustrating an exemplary viewing history 360 that is maintained by a decision tree television recommender. As shown in FIG. 3B, the viewing history 360 contains a plurality of records 361-369 each associated with a different program. In addition, for each program, the viewing history 360 identifies various program features in fields 370-379. The values set forth in fields 370-379 may be typically obtained from the electronic program guide 130. It is noted that if the electronic program guide 130 does not specify a given feature for a given program, the value is specified in the viewing history 360 using a "?".

Figure 3C:
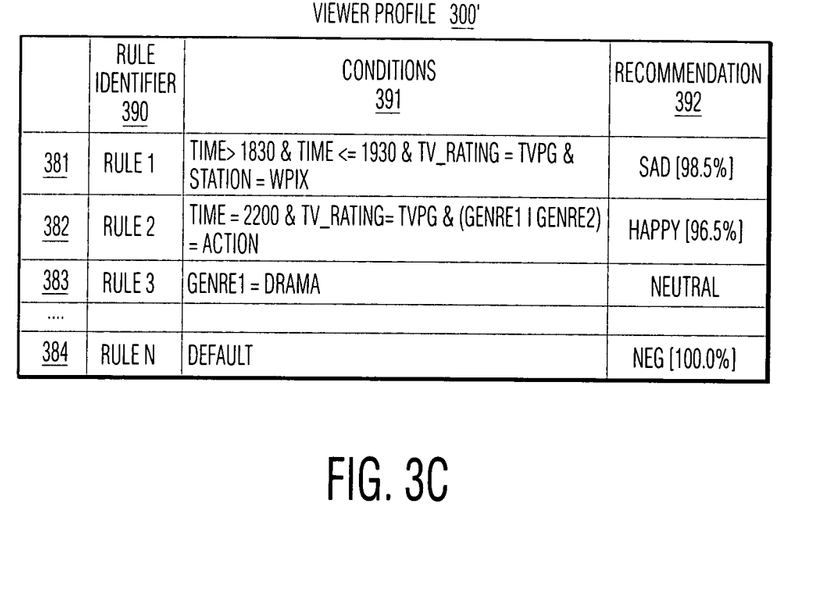
FIG. 3C illustrates a sample table from a viewer profile generated by a decision tree (DT) recommender from the viewing history of FIG. 3B.

FIG. 3C is a table illustrating an exemplary viewer profile 300' that may be generated by a decision tree television recommender from the viewing history 360 set forth in FIG. 3B. As shown in FIG. 3C, the decision tree viewer profile 300' contains a plurality of records 381-384 each associated with a different rule specifying viewer preferences. In addition, for each rule identified in column 390, the viewer profile 300' identifies the conditions associated with the rule in field 391 and the corresponding recommendation in field 392.

For a more detailed discussion of the generating of viewer profiles in a decision tree recommendation system, see, for example, U.S. patent application Ser. No. 09/466,406, filed Dec. 17, 1999, entitled "Method and Apparatus for Recommending Television Programming Using Decision Trees,", incorporated by reference above.

Figure 4:
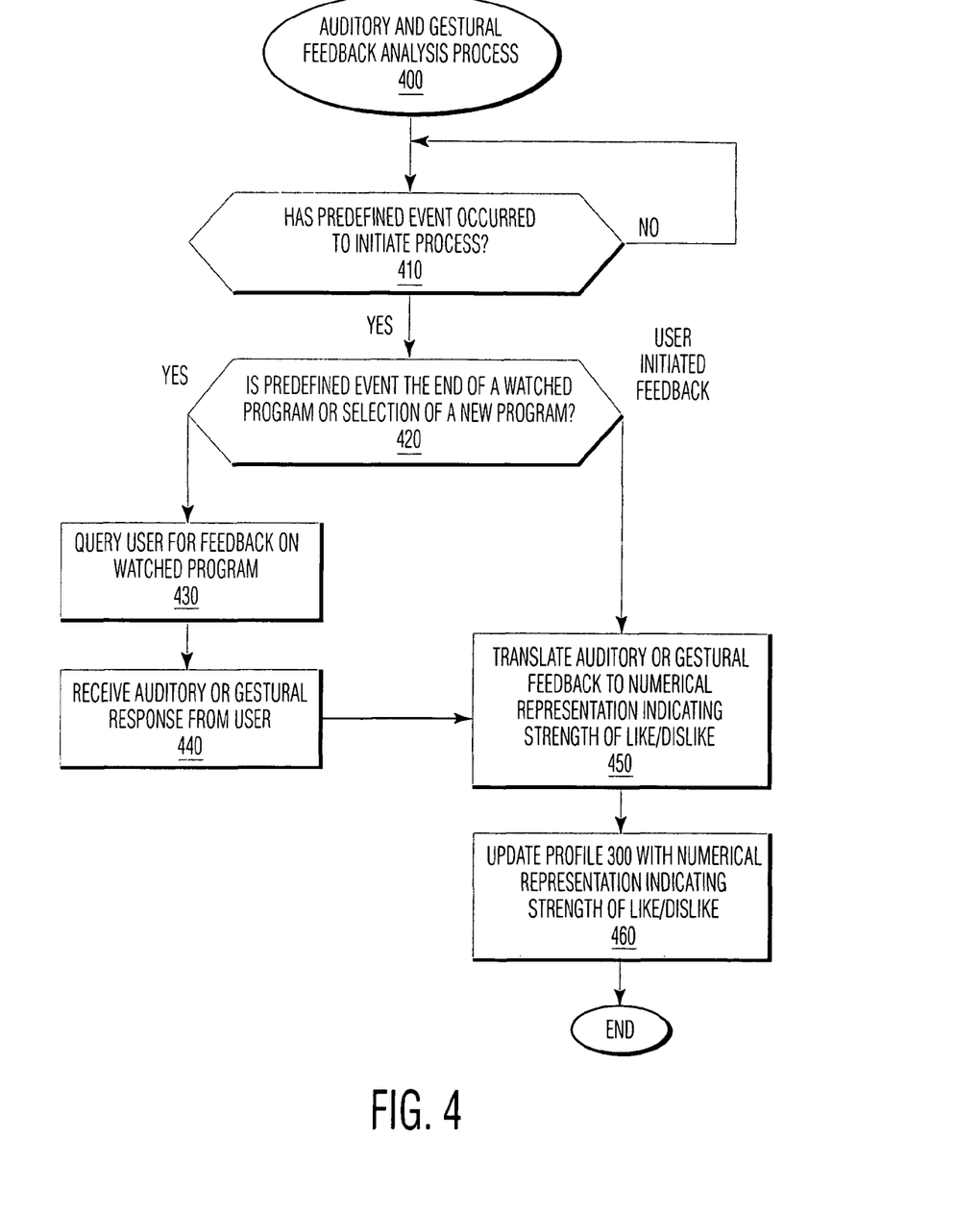
FIG. 4 is a flow chart describing an exemplary auditory and gestural feedback analysis process embodying principles of the present invention.

FIG. 4 is a flow chart describing an exemplary auditory and gestural feedback analysis process 400. The auditory and gestural feedback analysis process 400 may be initiated, for example, during step 410 upon the occurrence of a predefined event, such as the end of a watched program, the selection of a new channel, or the detection of predefined auditory or gestural feedback commands.

Thus, a test is performed during step 410 to determine if a predefined event has occurred to initiate the process 400. In the illustrative implementation of the auditory and gestural feedback analysis process 400, the predefined event may be system-initiated, for example, corresponding to the end of a watched program or the selection of a new channel, or user-initiated, for example, corresponding to the voluntary provision of auditory or gestural feedback information. It is further noted that the user-initiated auditory or gestural feedback behavior may be affirmative, such as the user indicating to the system 100 that a particular program was liked or disliked, or passive, such as the system deriving that a particular program was liked or disliked through facial expressions of the user.

If it is determined during step 410 that a predefined initiation event has not occurred, then program control returns to step 410 until such a predefined event occurs. If, however, it is determined during step 410 that a predefined initiation event has occurred, then a further test is performed during step 420 to determine if the detected predefined event corresponds to the end of a watched program or selection of a new program. In other words, the exemplary test performed during step 420 determines if the predefined event is system-initiated or user-initiated.

If it is determined during step 420 that the detected predefined event corresponds to the end of a watched program or selection of a new program (or another system-initiated event), then the user is queried for the desired feedback on the program that was just watched during step 430. For example, the query may request the user to rate a program that was just watched, or a particular program feature associated with the watched program. Thereafter, the auditory and gestural feedback analysis process 400 receives the user's auditory or gestural feedback response from during step 440.

If, however, it is determined during step 420 that the detected predefined event does not correspond to the end of a watched program or selection of a new program (or another system-initiated event), then the detected predefined event must be a user-initiated feedback event.

The system-initiated auditory or gestural feedback or the user-initiated auditory or gestural feedback is processed during step 450 to translate the auditory or gestural feedback to a numerical representation indicating the strength of the user's like or dislike of the indicated program (or program feature). Thereafter, the viewer profile 300 is updated during step 460 with the numerical representation indicating the strength of the user's like or dislike, before program control terminates, in a manner discussed further below.

As previously indicated, the auditory or gestural feedback can include (i) auditory commands, (ii) gestural commands, (iii) facial expressions, or (iv) a combination of the foregoing. The auditory commands processed by the auditory and gestural feedback analysis process 400 can include, for example, a number of auditory sounds, such as a clap, whistle or knocking, each mapped to the illustrative numerical scale between 1 ("hate") and 7 ("love"). In a further variation, the auditory commands can include recognizing the spoken words (or corresponding number) corresponding to the illustrative numerical scale between 1 ("hate") and 7 ("love").

Likewise, the gestural commands can include a number of gestural acts, such as raising a finger, hand or arm to various positions, or adjusting the number of the user's fingers in an up or down position to various configurations, each mapped to the illustrative numerical scale between 1 ("hate") and 7 ("love"). In a further variation, the gestural commands can include recognizing the user pointing to a selection from a list of the illustrative numerical scale between 1 ("hate") and 7 ("love") presented on the display 160.

The facial expression of the user can also be processed to derive whether or not the viewer liked or disliked a given program. For example, a positive or negative facial expression from the user while watching a program typically indicates whether the viewer liked or disliked the program. In a further variation, the intensity of the facial expression can be determined and varying degrees of facial expression can be mapped to the illustrative numerical scale between 1 ("hate") and 7 ("love"). The facial expression may be obtained, for example, in accordance with the techniques described in "Facial Analysis from Continuous Video with Application to Human-Computer Interface," Ph.D. Dissertation, University of Illinois at Urbana-Champaign (1999); or Antonio Colmenarez et al., "A Probabilistic Framework for Embedded Face and Facial Expression Recognition," Proc. of the Int'l Conf. on Computer Vision and Pattern Recognition," Vol. I, 592-97, Fort Collins, Colo. (1999), each incorporated by reference herein. The intensity of the facial expression may be obtained, for example, in accordance with the techniques described in U.S. patent application Ser. No. 09/705,666, filed Nov. 3, 2000, entitled "Estimation of Facial Expression Intensity Using a Bi-Directional Star Topology Hidden Markov Model,", assigned to the assignee of the present invention and incorporated by reference herein.

As previously indicated, the viewer profile 300 or 300' is updated during step 460 of the auditory and gestural feedback analysis process 400 with the numerical representation indicating the strength of the user's like or dislike. More specifically, the explicit viewer profile 300 of FIG. 3A can be updated, for example, by replacing the previous recorded value(s) with the newly obtained numerical representation indicating the strength of the user's like or dislike. Alternatively, the previous recorded value(s) with can be replaced with a moving average over a predefined time window or using an averaging scheme that assigns a higher weight to more recent scores. In a decision tree implementation, the viewer profile 300' of FIG. 3C can be updated by adding the watched program to the viewing history 360 and rebuilding the profile 300'. Alternatively, the strength of the user's like or dislike can be added directly to the viewer profile 300' by identifying each rule satisfied by the new program and adjusting the corresponding rule score in the following manner:

$$\text{New Score} = \text{Current Score} + \left[ \frac{1 \text{ New Program}}{\text{Total \# Programs Covered by Rule}} \times \text{Indicated Strength} \right]$$

In an implicit Bayesian recommender system, the implicit viewer profile (not shown) can be updated by treating a positive feedback from the user as if the viewer watched the program and incrementing the positive feature counts. Likewise, negative feedback from the user can be treated as if the viewer had not watched the program and incrementing the negative feature counts.

It is to be understood that the embodiments and variations shown and described herein are merely illustrative of the principles of this invention and that various modifications may be implemented by those skilled in the art without departing from the scope and spirit of the invention.

What is claimed is:

1. A method for updating a user profile relating to a television programming recommender, the updating of the user profile being carried out in a system configured for generating recommendations regarding content of programs comprising:
    obtaining said user profile indicating television program viewing preferences of a user;
    using an audio/visual device to capture user initiated feedback generated by the user and provided in the form of gestural feedback in the form of video information, and/or auditory sounds in the form of audio information, while the user is watching specific television programs;
    analyzing at least one of the audio and video information generated by an audio/visual capture device which is focused on said user while said user is viewing or completing viewing of a plurality of specific television programs at different times, to identify whether the said information is predefined behavioral feedback indicating present television program preferences of said user and, if so identified, translating the predefined behavioral feedback into a representation indicating a strength of user's liking or disliking of the specific program being watched; and
    wherein the updating of said user television program profile is based on processing the representation and the audio and/or video information is in the form of auditory or gestural feedback from the user and said feedback is initiated by the said system or initiated by the user and
    wherein if the occurrence of a predefined event relating to the television program being watched is detected then the feedback which is received for that program is either of a user response to a query which is generated to the user, in which case the feedback received is explicit feedback from the user which is used to update the user profile, or the feedback received is user initiated feedback which is implicit feedback which is used to update the user profile and the auditory and gestural feedback identified during the watching of the said program and which has been captured by the said audio/visual device is analyzed to validate the user's like or dislike of the said television program said predefined behavioral feedback includes auditory and/or gestural feedback, said feedback mapped to a scale corresponding to respective strengths of said preferences of said user in rating said plurality of television programs viewed.

2. The method of claim 1, wherein said auditory commands include one of a number of auditory sounds each mapped to a numerical scale.

3. The method of claim 1, wherein said auditory commands are recognized by a speech recognition system and respectively translated to a numerical scale corresponding to respective strengths of said preferences of said user in rating said plurality of television programs viewed relative to one another.

4. The method of claim 1, wherein said predefined behavioral feedback includes gestural commands.

5. The method of claim 4 wherein said gestural commands include one of a number of gestural acts each mapped to a numerical scale corresponding to respective strengths of said preferences of said user in rating said plurality of television programs viewed relative to one another.

6. The method of claim 4 wherein said gestural commands include pointing to a selection from a list of an illustrative numerical intensity scale presented on a display wherein the intensity scale includes 1 ("hate"), 2 ("dislikes"), 3 ("moderately negative"), 4 ("neutral"), 5 ("moderately positive"), 6 ("likes"), and 7 ("loves").

7. The method of claim 1 wherein said predefined behavioral feedback includes deriving said user preferences from a facial expression of said user.

8. The method of claim 1 wherein said predefined behavioral feedback includes deriving said user preferences from an intensity of a facial expression of said user.

9. The method of claim 1, including requesting feedback information directly from and confirmed by said user relative to the user's rating of said plurality of television programs relative to one another.

10. The method of claim 1 wherein said predefined behavioral feedback indicates the relative strengths on a rating basis of said user preferences from amongst said plurality of television programs.

11. The method of claim 1 wherein said predefined behavioral feedback indicates a strength of the user's like or dislike of the present television program by preferences of said user.

12. A method according to claim 1 wherein the explicit feedback is used to update an explicit user profile and the implicit feedback is used to update an implicit user profile.

13. A method according to claim 1 wherein if the detected predetermined event is the end of the said program or selection of a new channel the query is sent to the user to request explicit user feedback.

14. A system for updating a user profile for a television programming recommender, operative to generate recommendations regarding content of programs based on the user profile comprising:
   a memory for storing computer readable code and said user profile; and
   a processor operatively coupled to said memory, said processor being configured to;
   read from said memory said user profile indicating preferences of a user;
   using an audio/visual device to capture user initiated feedback generated by the user provided in the form of gestural feedback in the form of video information, and/or sounds in the form of audio information, while the user is watching specific television programs;
   wherein the processor is configured to analyze at least one of audio and video information of said user while viewing or completing viewing of a plurality of television programs at different times to identify predefined behavioral feedback indicating present television program preferences of said user; and
   update said user profile based on said predefined behavioral feedback;
   translate the predefined behavioral feedback into a representation indicating a strength of a user's liking or disliking of a specific program being watched; and
   update said user profile by processing said representation, the audio and/or video information is in the form of auditory or gestural feedback from the user and said feedback is initiated by the said system or initiated by the user and wherein if the occurrence of a predefined event relating to the television program being watched is detected then the feedback which is received for that program is either of a user response to a query which is generated to the user in which case that response is explicit feedback which is used to update the user profile or the feedback received is user initiated feedback which is implicit feedback which is used to update the user profile and the auditory and gestural feedback identified during the watching of the program is analyzed to validate the user's like or dislike of the said television program said predefined behavioral feedback includes, auditory and/or gestural commands mapped to a scale corresponding to respective strengths of said preferences of said user in rating said plurality of television programs viewed.

15. A system according to claim 14 wherein the system includes an explicit user profile in the memory which is updated with regard to explicit feedback which is received and an implicit user profile in the memory which is updated with regard to implicit feedback which is received.

16. A system according to claim 14 wherein if the detected predetermined event is the end of the said program or selection of a new channel the system sends the query to the user.

\* \* \* \* \*

UNITED STATES PATENT AND TRADEMARK OFFICE
CERTIFICATE OF CORRECTION

PATENT NO.      : 8,751,957 B1
APPLICATION NO. : 09/718261
DATED           : June 10, 2014
INVENTOR(S)     : Trajkovic et al.

Page 1 of 1

It is certified that error appears in the above-identified patent and that said Letters Patent is hereby corrected as shown below:

In the Claims:

Col. 9, Claim 14, Line 32:
ADD before sounds --auditory--

Signed and Sealed this
Second Day of September, 2014

Michelle K. Lee
*Deputy Director of the United States Patent and Trademark Office*